(12) United States Patent
Lucas et al.

(10) Patent No.: US 6,484,101 B1
(45) Date of Patent: Nov. 19, 2002

(54) 3-DIMENSIONAL INTERACTIVE IMAGE MODELING SYSTEM

(75) Inventors: Mark R. Lucas, Melbourne Beach, FL (US); Kenneth Melero, Palm Bay, FL (US)

(73) Assignee: ImageLinks, Inc., Melbourne, FL (US)

( * ) Notice: Subject to any disclaimer, the term of this patent is extended or adjusted under 35 U.S.C. 154(b) by 45 days.

(21) Appl. No.: 09/640,135

(22) Filed: Aug. 16, 2000

(51) Int. Cl.⁷ .............................................. G06F 19/00
(52) U.S. Cl. ............................................................ 702/5
(58) Field of Search ................... 702/2, 5, 11, 12, 702/13, 14, 16, 17

(56) References Cited

U.S. PATENT DOCUMENTS

| | | | |
|---|---|---|---|
| 4,463,380 A | 7/1984 | Hooks, Jr. | 358/160 |
| 5,124,915 A * | 6/1992 | Krenzel | 702/5 |
| 5,381,338 A | 1/1995 | Wysocki et al. | 364/449 |
| 5,408,541 A | 4/1995 | Sewell | 382/48 |
| 5,467,271 A | 11/1995 | Abel et al. | 364/420 |
| 5,469,167 A | 11/1995 | Polge et al. | 342/25 |
| 5,471,056 A | 11/1995 | Prelat | 250/253 |
| 5,587,715 A | 12/1996 | Lewis | 342/357 |
| 5,726,656 A | 3/1998 | Frankot | 342/25 |
| 5,774,826 A | 6/1998 | McBride | 701/207 |
| 5,796,365 A | 8/1998 | Lewis | 342/357 |
| 5,838,634 A * | 11/1998 | Jones et al. | 367/73 |
| 5,848,373 A | 12/1998 | DeLorme et al. | 701/200 |
| 5,867,804 A | 2/1999 | Pilley et al. | 701/120 |
| 5,966,135 A | 10/1999 | Roy et al. | 345/433 |
| 5,978,804 A | 11/1999 | Dietzman | 707/10 |
| 5,986,604 A | 11/1999 | Nichols et al. | 342/357.12 |
| 6,038,512 A * | 3/2000 | Williams | 367/14 |
| 6,236,907 B1 | 5/2001 | Hauwiller et al. | 700/283 |

\* cited by examiner

*Primary Examiner*—Donald E. McElheny, Jr.
(74) *Attorney, Agent, or Firm*—Hamilton, Brook, Smith & Reynolds, P.C.

(57) ABSTRACT

A system and method for generating custom geospatial information maps and precision corrected images allows realtime interactive production of a desired output image by incorporating user selectable parameters that define various image synthesizing operations. A graphical user interface allows a user to specify parameters that define the desired output image. The parameters define image synthesizing operations such as area, projection, datum, fusion, masking, blending, mosaiking, resampling, and others. The desired output image is processed by an image assembly server, and electronically delivered to a user via a public access network. A user may therefore receive a desired output image that conforms to a variety of user-specified parameters interactively via the image assembly server, and interactively update and refine the desired output image via the graphical user interface, thereby providing an active archive of a set of images that can be revised dynamically.

27 Claims, 3 Drawing Sheets

Product Specification File

Retrieve ($O_A, O_B, O_C, O_D, V_A, V_B, V_C, V_D$) => $O_{ALL}$ — 46a
Mosiac ($O_A, O_B, O_C, O_D$) => $O_{ALL}$ — 46b
Mosiac ($V_A, V_B, V_C, V_D$) => $V_{ALL}$ — 46c
Fuse ($O_{ALL}, V_{ALL}$) => R — 46d
Write (.gif, R) — 46e

3-DIMENSIONAL INTERACTIVE IMAGE MODELING SYSTEM

BACKGROUND OF THE INVENTION

Geospatial image data is often used to generate a map of a geographical area to denote a variety of geographic features. Such geospatial image data is gathered by a variety of techniques, such as via satellites and aircraft, and encompasses data gathered by a variety of sensor mediums, such as optical, radar, infrared, laser, and others. Often, the geospatial image data must be processed through mathematical synthesizing operations to obtain a desired output image. The synthesizing operations typically require significant manual efforts, and require substantial time and computational resources to compute. Accordingly, the desired output images may only be gathered periodically, must anticipate a substantial time delay, and require manual intervention in order to modify or apply a new synthesizing operation to the geospatial data to obtain the desired output image.

Raw geospatial data has been and continues to be gathered by a variety of governmental and private entities. The National Image and Mapping Agency (NIMA), The National Reconnaissance Office (NRO), and the Federal Geographic Data Committee (FGDC) are among the various entities that catalog raw geospatial data. The raw geospatial data is typically used in Geographic Information Systems (GIS) according to protocols such as the National Spatial Data Infrastructure (NSDI), promulgated by the FGDC, and embodied in the National Geospatial Data Clearinghouse, a public domain collection of geospatial data organized to promote cooperative production and sharing of geospatial data among federal, state, academic, corporate, and private entities having an interest in geospatial data. While initially developed to support intelligence operations for military purposes, geospatial data is now being used for a variety of research and consumer purposes, including oil and gas mining, agricultural conditions, outdoor expeditions such as camping, hunting and fishing, and recreation such as golf and flight simulation.

Traditionally, geospatial images produced from raw geospatial data have been produced through time intensive manual computations. The raw geospatial data is gathered from various sensors focused on a particular geographic area. These computations typically gather the raw geospatial data from a variety of geographic areas, and synthesize the desired output image. The synthesizing operations typically include polynomial warping techniques to distort one image to match one of an adjacent geographic area, and resampling techniques to project, filter, combine, fuse, and mask the images represented by the raw geospatial data. Other synthesizing operations are known to those skilled in the art. Since the synthesizing operations are performed by a time intensive manual sequence, the results typically represent a static archive because the resultant output images are used in static form with infrequent modification.

For example, a desired output image might represent a fusion of an optical satellite image with an infrared aircraft scanning of a land mass having fossil fuel reserves to facilitate mining or oil production. Similarly, an agricultural application might involve a combining of a high resolution monochrome image with a lower resolution color image to ascertain or predict vegetation patterns. A PC application might employ images of a variety of golf courses to provide a realistic simulation. Many other uses and applications can be contemplated.

As illustrated above, generation of geospatial images corresponding to a desired output image can be time and computationally intensive. Manual manipulation of the various parameters that define each instantiation of the desired output image is required. It would be beneficial, therefore, to provide a system and method for allowing user selectable parameters to specify the image synthesizing operations which define a desired output image, to allow interactive realtime generation of the desired output image from a remote computing device based upon the user selectable parameters, and to provide delivery of the desired output image to the user via an electronic medium such as the Internet.

SUMMARY OF THE INVENTION

A system and method for generating custom geospatial information maps and precision corrected images allows realtime interactive production of a desired output image by incorporating user selectable parameters that define various image synthesizing operations. A graphical user interface allows a user to specify parameters that define the desired output image via a remote computing device over a public access network such as the Internet. The parameters define image synthesizing operations such as area, projection, datum, fusion, masking, blending, mosaicking, resampling, and others. The desired output image is processed by an image assembly server according to the parameters and a variety of geospatial image data sources, and electronically delivered to a user via a public access network. A user may therefore receive a desired output image that conforms to a variety of user-specified parameters interactively via an image assembly server, and interactively update and refine the desired output image via the graphical user interface, thereby providing an active archive of a set of images that can be revised dynamically.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
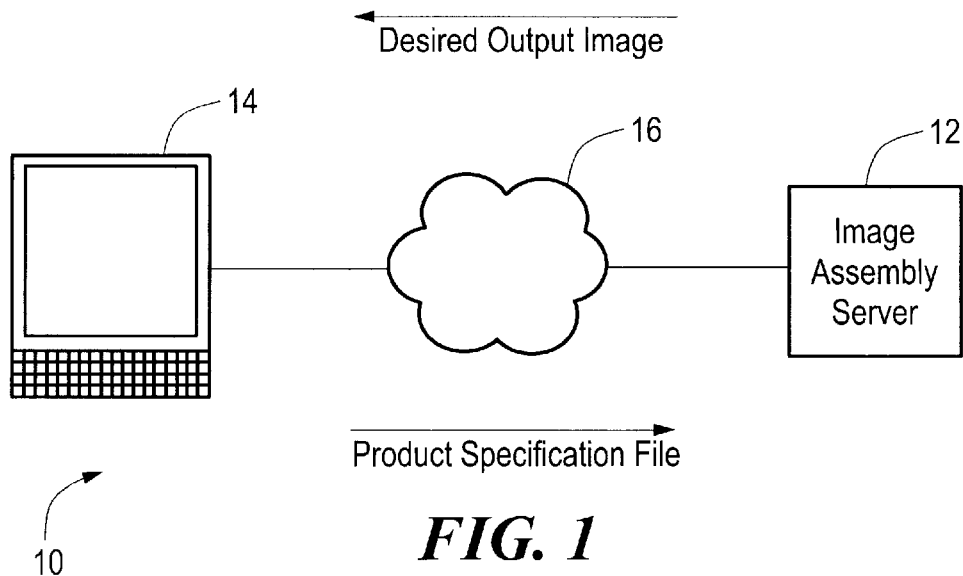
FIG. 1 shows a block context diagram of the interactive image modeling system described herein.

FIG. 1 shows a block context diagram of the interactive image modeling system 10 as described herein. An image assembly server 12 is in communication with a user computing device 14 such as a PC via a public access network 16. The user computing device 14 is operable to send requests for a desired output image to the image assembly server 12. The image assembly server is responsive to the requests for a desired output image, and sends the desired output image to the user computing device 14 via the public access network 16.

Figure 2:
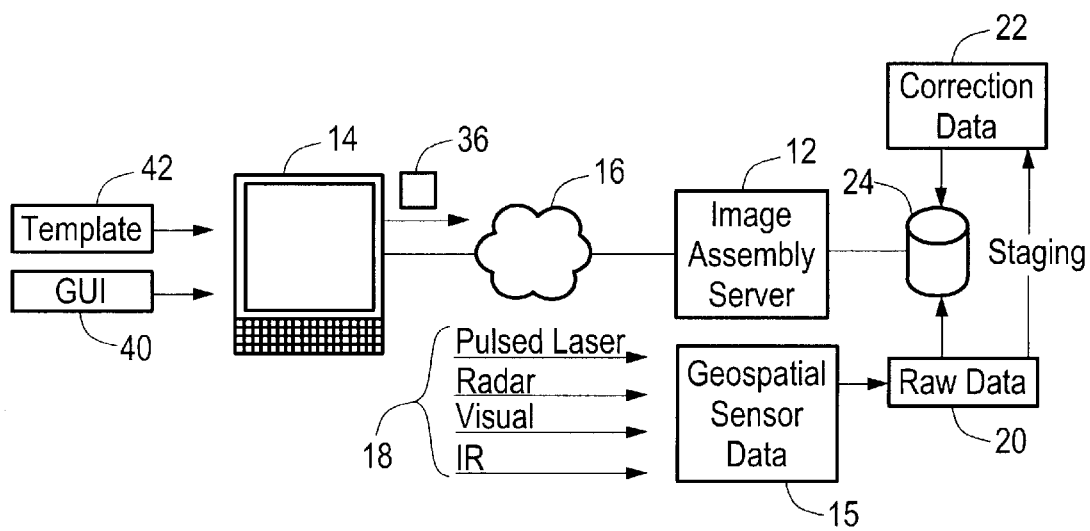
FIG. 2 shows the system of FIG. 1 in greater detail.

FIG. 2 shows the system depicted in FIG. 1 in greater detail. Referring to FIG. 2, geospatial sensor data 15 is gathered from a variety of sensor data mediums 18, such as optical or visual, infrared (IR), radar, and pulsed laser, and may be indicative of data sets such as vegetative indexes, flood plane classifications, population density maps, and spectral imagery. Gathering the geospatial sensor data 15 produces raw geospatial data 20. The raw geospatial data is manipulated in a process known as staging to produce correction data 22, known as metadata, corresponding to inaccuracies in the raw geospatial data. The correction data 22 is stored as a plurality of geometry files in a geospatial data base 24 along with the corresponding raw geospatial data 20 to populate the geospatial database 24 with geospatial data.

The desired output image is defined by a product specification file. A user generates a product specification file 36 via a variety of methods, described further below. In a particular embodiment, the user computing device 14 executes a product definition application via a graphical user interface (GUI) 40 to access a template 42. The template is indicative of parameters, including features and operations, which define the desired output image. The parameters may be predetermined or user defined, depending on the template. Using the graphical user interface 40 and the template 42, the user computing device is employed to define the user defined parameters. The user computing device builds the product specification file 36 from the user defined parameters and the predetermined parameters. The completed product specification file 36 is then sent to the image assembly server 12 via the Internet 16.

Figure 3:
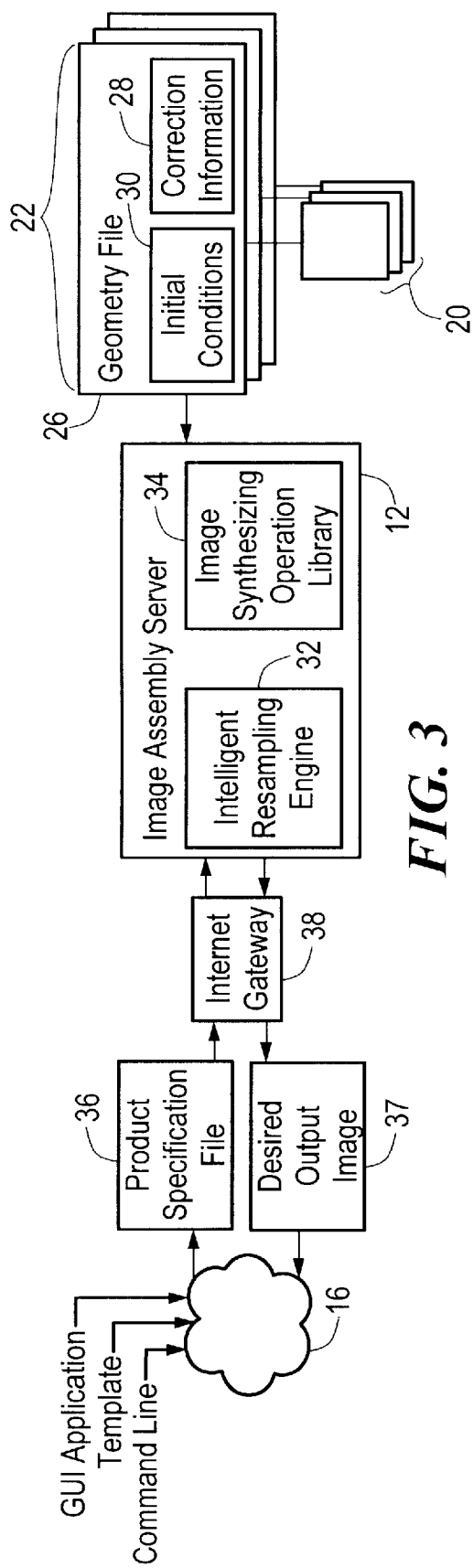
FIG. 3 shows the image assembly server.

FIG. 3 shows the image assembly server in greater detail. Referring to FIGS. 2 and 3, the image assembly server 12 includes an intelligent resampling engine 32 and an image synthesizing operation library 34. The product specification file 36 is sent from the user computing device 14 via an Internet gateway 38. The product specification file 36 contains keywords which correspond to image synthesizing operations in the image synthesizing operation library 34. One or more parameters define each of the image synthesizing operations to be performed. The parameters are expressed as keywords in the product specification file 36, and represent aspects and features of the desired output image 37. The intelligent resampling engine 32 scans the product specification file 36 to determine a synthesizing operation to be performed, and retrieves the corresponding image data from the geospatial database 24. The intelligent resampling engine 32 references the image synthesizing operation library 34 to find the synthesizing operation to be performed, and applies the operation to the geospatial image data retrieved from the geospatial database 24. Note that successive synthesizing operations may be applied to the same gesapatial image data.

The image data stored in the geospatial database is stored in a form which allows it to be used by the intelligent resampling engine 32. The geospatial database 24 includes raw data files 20 and geometry files 26. The geometry files store the correction data 22 in two components. An initial conditions component defines corrections that address sensor-based inaccuracies in the data as originally gathered. Such corrections may, for example, include pitch and roll of an airplane, or camera angle relative to the ground. The second component is correcting information that defines corrections to the initial conditions component. This information may include, information such as orthorectification data to adjust for parallax, for example. An initial conditions component and a correcting information component is stored in the geospatial database to correspond to each raw data file 20.

Figure 4:
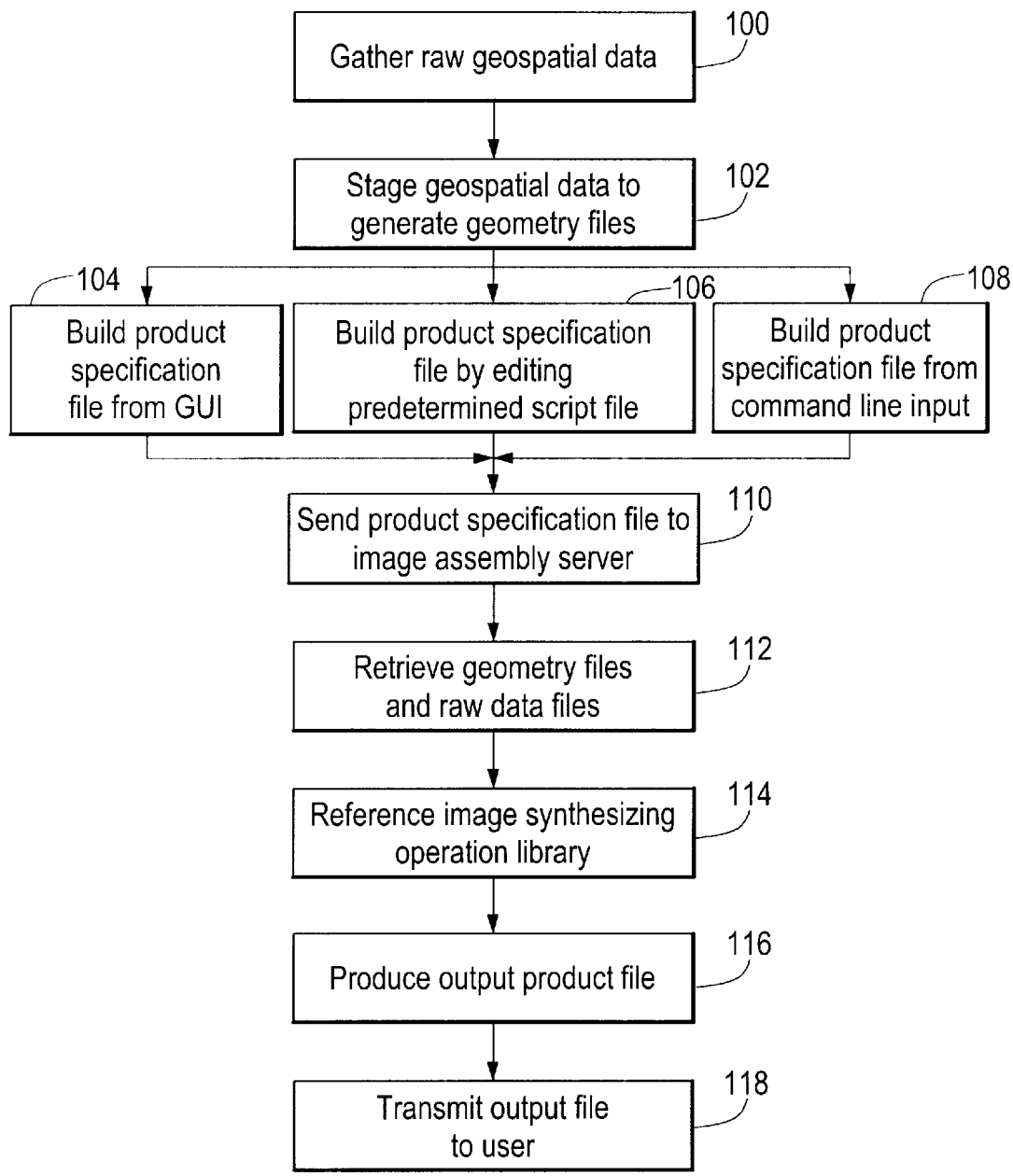
FIG. 4 shows a flowchart depicting generation of a desired output image.

A flowchart of the generation of a desired output image 37 is shown in FIG. 4. Raw geospatial data is gathered from a variety of sources, as depicted at step 100. The raw geospatial data is staged to generate a plurality of geometry files, as disclosed at step 102. The product specification file is built from one of a variety of sources, including via a GUI, as shown at step 104, by editing a predetermined script file, as shown at step 106, or generated as a sequence of command lines from direct user input, as depicted at step 108. The product specification file is sent to the image assembly server 12 via the Internet 14, and is received at the image assembly server 12 via the Internet gateway 38, as shown at step 110. The intelligent resampling engine 32 retrieves the corresponding geometry files and raw data files needed, as disclosed at step 112. The image synthesizing operation library 34 is referenced to find the corresponding synthesizing operations to apply, as depicted at step 114. The output product file containing the desired output image is produced from the synthesizing operations, as shown at step 116, and the output product file is transmitted to the user, as disclosed at step 118.

Figure 5B:
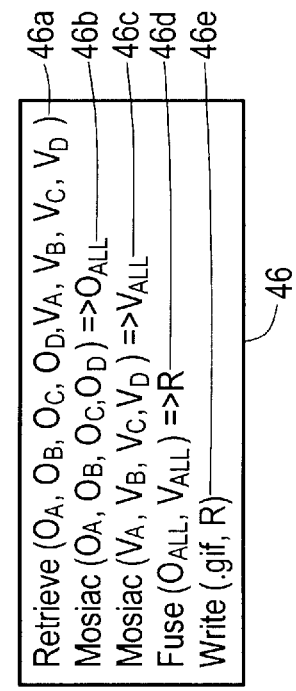
FIG. 5b shows the product specification file referencing the images of FIG. 5a to generate a desired output image.
Figure 5A:
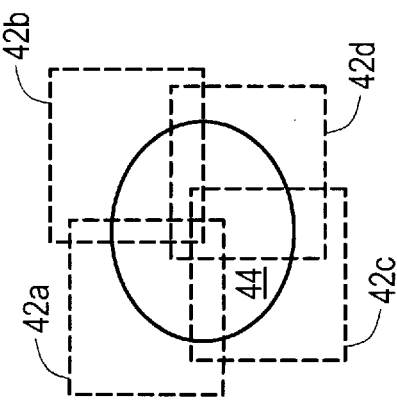
FIG. 5a shows an example of images used to generate a desired output image.

FIGS. 5a and 5b show an example product specification file and the corresponding images. This example demonstrates a desired output image depicting soil vegetative indexes as might be used in an assessing the agricultural potential of a proposed farming area region 44. Visual, or optical images of the area are fused with images depicting vegetative indexes. Geometry files and raw geospatial data files exist for areas 42a–42d from the sensor data mediums for optical information and for vegetative indexes information, as defined in table I:

TABLE I

| Image | Area | Sensor Measuring Medium |
| --- | --- | --- |
| $O_A$ | 42A | Optical |
| $O_B$ | 42B | Optical |
| $O_C$ | 42C | Optical |
| $O_D$ | 42D | Optical |
| $V_A$ | 42A | Vegetative |
| $V_B$ | 42B | Vegetative |
| $V_C$ | 42C | Vegetative |
| $V_D$ | 42D | Vegetative |

A product specification file 46 defines the operations to produce the desired output image indicative of soil vegetative indexes for the region 44. Line 46a identifies and retrieves the geometry files and raw data files needed. Line 46b specifies a mosaicking operation to be applied to the optical images $O_A$–$O_D$ to combine the overlapping areas which cover the region 44, and produces the resultant image $O_{ALL}$. Similarly, line 46c specifies a mosaicking for the vegetative images $V_A$–$V_D$, to combine the overlapping areas 42a–42d with respect to vegetative indexes to generate the resultant image $V_{ALL}$. Line 46d specifies a fusion operation on the previous two images $O_{ALL}$ and $V_{ALL}$ to produce a resultant image R corresponding to the desired output image. Line 46e specifies that the image R be written to an output product file in .gif format, where it may be transmitted to the user computing device as described above.

The product specification file which defines the desired output image may be provided from a variety of sources. In the particular embodiment described above, a product definition application invokes a GUI and a template to provide predetermined parameters, to which user defined parameters are added. A typical GUI might incorporate point-and-click button bars corresponding to the user defined parameters, for example. The GUI which produces the product specification file can provide a range of predetermined parameters and user defined parameters, depending on the level of control and complexity desired by the user. Point-and-click button bars might be provided to correspond to each of the user defined parameters, while the predetermined parameters are constant and do not require user intervention. At a more sophisticated end of the range, a user might be a scientist, researching fossil fuels in a region, who requires much control over the parameters of the desired output image, and is not hindered by the complexity of the interface. At a less sophisticated end of the range might be a real estate agent who merely requires a visual detail delineating property lines, and who does not need to apply a complex series of synthesizing operations to achieve a desired output image.

As indicated above, the parameters defined in the product specification file, both user defined and predetermined, indicate the synthesizing operations which define the desired output image. These features and operations are expressed as a sequence of keywords in the product specification file. In the particular embodiments described above, the keywords are written by the GUI, with levels of user input varying depending on the sophistication of the user. In yet another embodiment of the invention, the product specification file can be manually edited as a text file. The text file could be written with a template provided as a starting point, from which the user may freely modify. Further, a user may wish to build their own product specification file, thereby retaining as much control as possible over the desired output image.

The interactive nature of the product specification file and the resultant generation of the desired output image, therefore, allows a user to generate a series of desired output images, each possibly differing only by a single feature or aspect. In this manner, a user may approach a geospatial research task in a "what if" manner, allowing the effect of different parameters to be seen individually. In another context, a constant product specification file could be provided to a plurality of users to allow each to recreate the desired output image on their local computing device. A business method providing such desired output images could effect a pricing scale that is driven in part by the number of users expected. When a large number of users are expected for a relatively narrow, or constant, range of desired output images, each could be charged less because the total revenue derived from the group would offset the resource cost associated with generating the desired output image. Similarly, a dedicated user requiring a range of allowed parameters, could be provided a complex GUI at a higher price because that user would be expected to consume more resources in generating the desired output images.

Further, the system and methods described herein are applicable to a wide variety of uses of the geospatial data and resulting desired output images. While prior art usage of geospatial data has typically been reserved to well-funded applications such as military and scientific research, the system and method defined herein makes the usage of geospatial data applicable to recreational contexts as well. Desired output images corresponding to the topography of an area can be used in flight simulator PC applications. A PC golf application might use a variety of visual geospatial data to provide a user with a variety of local and distant golf courses. Indeed, a marketing strategy consistent with the expected number of users as described above can make such recreational usage feasible.

Those skilled in the art should readily appreciate that the programs defining the operations and methods defined herein are both deliverable to an image assembly server and a user computing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable out of a memory by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware and software components, or hardware, software or firmware simulators.

While the system and method for interactively generating geospatial image maps have been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of interactively generating geospatial image maps comprising:

gathering, from a plurality of geospatial sensors, raw geospatial data;

determining, for the raw geospatial data, correction data indicative of sensor based inaccuracies in the raw geospatial data;

staging the raw geospatial data using the correction data to produce a plurality of raw geospatial files and a plurality of geometry files each including correcting metadata;

storing the plurality of raw geospatial files and the plurality of geometry filing in a geospatial database adapted to store geospatial image data including raw geospatial data and correcting metadata;

generating a product specification file having a plurality of keywords indicative of the desired output image;

assembling, from the plurality of geometry files, a resampling file set including the geometry files and the raw geospatial data files corresponding to the desired output image;

processing, in a resampling engine, the product specification file and the resampling file set to produce the desired output image; and transmitting, to a user, the desired output image.

2. The method of claim 1 wherein staging further comprises generating an initial conditions component and a correcting component, wherein the initial conditions component is indicative of sensor based deviations during sensor reading, and wherein the correcting component is indicative of a measurable deviation computed from the raw geospatial data and the initial conditions component.

3. The method of claim 1 wherein assembling the resampling file set further comprises:
   identifying at least one geometry file from the plurality of geometry files and a corresponding raw geospatial file from the plurality of raw geospatial files to be employed for processing the product specification file;
   requesting, from the geospatial database, each of the identified geometry files and raw geospatial files as the resampling file set; and
   receiving, at the image assembly server, the resampling file set.

4. The method of claim 1 wherein processing further comprises:
   parsing, from the product specification file at least one keyword indicative of an image synthesizing operation;
   selecting, from the resampling file set, a synthesizing file set corresponding to files to be employed by the image synthesizing operation;
   referencing, in an image synthesizing library, at least one of the image synthesizing operations corresponding to the keyword; and
   synthesizing, via the resampling engine and the image synthesizing operation, the synthesizing file set to yield a synthesized file set.

5. The method of claim 4 further comprising:
   deriving a further resampling file set from the synthesized file set;
   parsing, from the product specification file, at least one additional keyword indicative of an image synthesizing operation;
   referencing, in an image synthesizing library, at least one image synthesizing operation corresponding to the keyword; and
   synthesizing, via the resampling engine and the image synthesizing operation, the further resampling file set to yield a successive synthesized file set.

6. The method of claim 4 wherein synthesizing via the resampling engine further comprises operations selected from the group consisting of mosaicking, fusing, blending, masking, projecting, rotating, and orienting.

7. The method of claim 1 wherein processing further comprises
   parsing, from the product specification file, a desired output format; and
   translating, based on the desired output format, the synthesized file set into the desired output image.

8. The method of claim 1 wherein generating the product specification file further comprises:
   building a product template file having a plurality of parameters, each of the parameters indicative of an aspect of the desired output image;
   defining the parameters as user definable parameters and default parameters;
   specifying, for each of the default parameters a default value indicative of the desired output image;
   receiving, for each of the user definable parameters, user-specified input data corresponding to the desired output image.

9. The method of claim 1 wherein generating the product specification file further comprises receiving, from a user, the keywords indicative of the desired output image.

10. The method of claim 1 wherein generating the product specification file further comprises:
    executing a product definition application at a remote computing device;
    generating, via user driven inputs to the product definition application at least one keyword indicative of an image synthesizing operation;
    storing at least one keyword in the product specification file; and
    transmitting, to the image assembly server, the product specification file.

11. The method of claim 10 wherein generating the product specification file further comprises:
    receiving, via the product definition application, point-and-click user driven inputs; and
    storing, in the product specification file, keywords corresponding to the point-and-click user driven inputs.

12. The method of claim 11 wherein transmitting the product specification file and transmitting the desired output image further comprises transmitting via an Internet gateway to a public access network.

13. A system for generating custom geospatial image maps comprising:
    a geospatial data base adapted to store a plurality of geometry files, wherein the geometry files correspond to raw geospatial data and include correction data indicative of sensor based inaccuracies in the raw geospatial data;
    a product specification file indicative of a desired output image, wherein the product specification file includes keywords indicative of processing operations and parameters corresponding to the desired output image;
    a user interface operable to build the product specification file; and
    a resampling engine operable to perform image synthesizing operations to produce the desired output image as a result of the product specification file and at least one of the plurality of geometry files.

14. The system of claim 13 wherein the correction data further comprises initial condition parameters and a set of correcting parameters, wherein the initial condition parameters are indicative of sensor based deviations during sensor reads, and wherein the set of correcting parameters are indicative of a measurable deviation computed from the raw geospatial data and the initial condition parameters.

15. The system of claim 13 further comprising a resampling file set, wherein the resampling file set includes at least one of the raw geospatial files and a corresponding one of the geometry files to be employed for processing the product specification file to produce the desired output image.

16. The system of claim 13 wherein the image assembly server further includes a library of image synthesizing operations in communication with the resampling engine.

17. The system of claim 16 wherein the product specification file further comprises at least one keyword corresponding to at least one of the image synthesizing operations in the library of image synthesizing operations.

18. The system of claim 13 wherein the desired output image has an output file format and the resampling engine is further operable to write the desired output image in the output file format.

19. The system of claim 13 further comprising a product template file having a plurality of the parameters, each indicative of an aspect of the desired output image, wherein the parameters further comprise user-definable parameters and default parameters.

20. The system of claim 19 wherein each of the parameters corresponds to at least one of the keywords in the product specification file.

21. The system of claim 13 further comprising a product definition application operable to receive at least one user input and further operable to generate the product specification file from the user inputs, wherein the user inputs are indicative of keywords.

22. The system of claim 21 wherein the product definition application further includes at least one point-and-click interface, wherein the user inputs are received via the point and click interface.

23. The system of claim 22 wherein the product definition application executes on a remote computing device in communication with the image assembly server via an Internet gateway and a public access network.

24. The system of claim 13 further comprising an Internet gateway operable to transmit the product specification file and the desired output image via a public access network.

25. The system of claim 13 wherein the image synthesizing operations include operations selected from the group consisting of mosaicking, fusing, blending, masking, projecting, rotating, area, datum, and orienting.

26. A computer program product having computer program code for interactively generating geospatial image maps comprising:

computer program code for gathering, from a plurality of geospatial sensors, raw geospatial data;

computer program code for determining, for the raw geospatial data, correction data indicative of sensor based inaccuracies in the raw geospatial data;

computer program code for staging the raw geospatial data using the correction data to produce a plurality of raw geospatial files and a plurality of geometry files each including correcting metadata;

computer program code for storing the plurality of raw geospatial files and the plurality of geometry filing in a geospatial database adapted to store geospatial image data including raw geospatial data and the correcting metadata;

computer program code for generating a product specification file having a plurality of keywords indicative of the desired output image;

computer program code for assembling, from the plurality of geometry files, a resampling file set including the geometry files and the raw geospatial data files corresponding to the desired output image;

computer program code for processing, in a resampling engine, the product specification file and the resampling file set to produce the desired output image; and computer program code for transmitting, to a user, the desired output image.

27. A system for generating custom geospatial image maps comprising:

means for gathering, from a plurality of geospatial sensors, raw geospatial data;

means for determining, for the raw geospatial data, correction data indicative of sensor based inaccuracies in the raw geospatial data;

means for staging the raw geospatial data using the correction data to produce a plurality of raw geospatial files and a plurality of geometry files each including correcting metadata;

means for storing the plurality of raw geospatial files and the plurality of geometry filing in a geospatial database adapted to store geospatial image data including raw geospatial data and the correcting metadata;

means for generating a product specification file having a plurality of keywords indicative of the desired output image;

means for assembling, from the plurality of geometry files, a resampling file set including the geometry files and the raw geospatial data files corresponding to the desired output image;

means for processing, in a resampling engine, the product specification file and the resampling file set to produce the desired output image; and means for transmitting, to a user, the desired output image.

* * * * *